(12) United States Patent
Fu et al.

(10) Patent No.: US 11,127,333 B1
(45) Date of Patent: Sep. 21, 2021

(54) METHOD FOR CORRECTING SCREEN DISPLAY BASED ON NEGATIVE FEEDBACK

(71) Applicant: Amlogic (Shanghai) Co., Ltd., Shanghai (CN)

(72) Inventors: Tai Fu, Shanghai (CN); Pei Pei, Shanghai (CN); Zhigang Yu, Shanghai (CN)

(73) Assignee: Amlogic (Shanghai) Co., Ltd., Shanghai (CN)

( * ) Notice: Subject to any disclaimer, the term of this patent is extended or adjusted under 35 U.S.C. 154(b) by 494 days.

(21) Appl. No.: 16/325,042

(22) PCT Filed: Sep. 27, 2018

(86) PCT No.: PCT/CN2018/108104
§ 371 (c)(1),
(2) Date: Feb. 12, 2019

(87) PCT Pub. No.: WO2019/091245
PCT Pub. Date: May 16, 2019

(30) Foreign Application Priority Data

Nov. 7, 2017 (CN) .......................... 201711086297.8

(51) Int. Cl.
*G09G 3/20* (2006.01)
*G09G 5/10* (2006.01)

(52) U.S. Cl.
CPC .............. *G09G 3/2003* (2013.01); *G09G 5/10* (2013.01); *G09G 2320/0666* (2013.01); *G09G 2360/141* (2013.01); *G09G 2360/145* (2013.01)

(58) Field of Classification Search
None
See application file for complete search history.

(56) References Cited

FOREIGN PATENT DOCUMENTS

| CN | 101447161 A | 6/2009 |
|---|---|---|
| CN | 103501430 A | 1/2014 |
| CN | 104167174 A | 11/2014 |
| CN | 105355189 A | 2/2016 |
| CN | 106297664 A | 1/2017 |
| CN | 106409251 A | 2/2017 |
| CN | 106507082 A | 3/2017 |

*Primary Examiner* — Aneeta Yodichkas
(74) *Attorney, Agent, or Firm* — The Dobrusin Law Firm, PC

(57) ABSTRACT

The invention discloses a method for correcting screen display based on negative feedback. Correction of the G channel value, the B channel value and the R channel value in turn is marked as a correction of the working parameters of the screen. Measuring if the luminance, color temperature y-axis coordinate and color temperature x-axis coordinate of the screen display simultaneously reach the corresponding target values after correcting the working parameters for one time; if yes, the current gray scale correction is ended; otherwise, correcting the working parameters of the current gray scale again by starting from correction of the G channel value. The R channel value, the G channel value and the B channel value are corrected in a separate manner based on the feedback, and the correction process is simplified, such that the accuracy of a single correction is higher and the correction speed is improved.

8 Claims, 1 Drawing Sheet

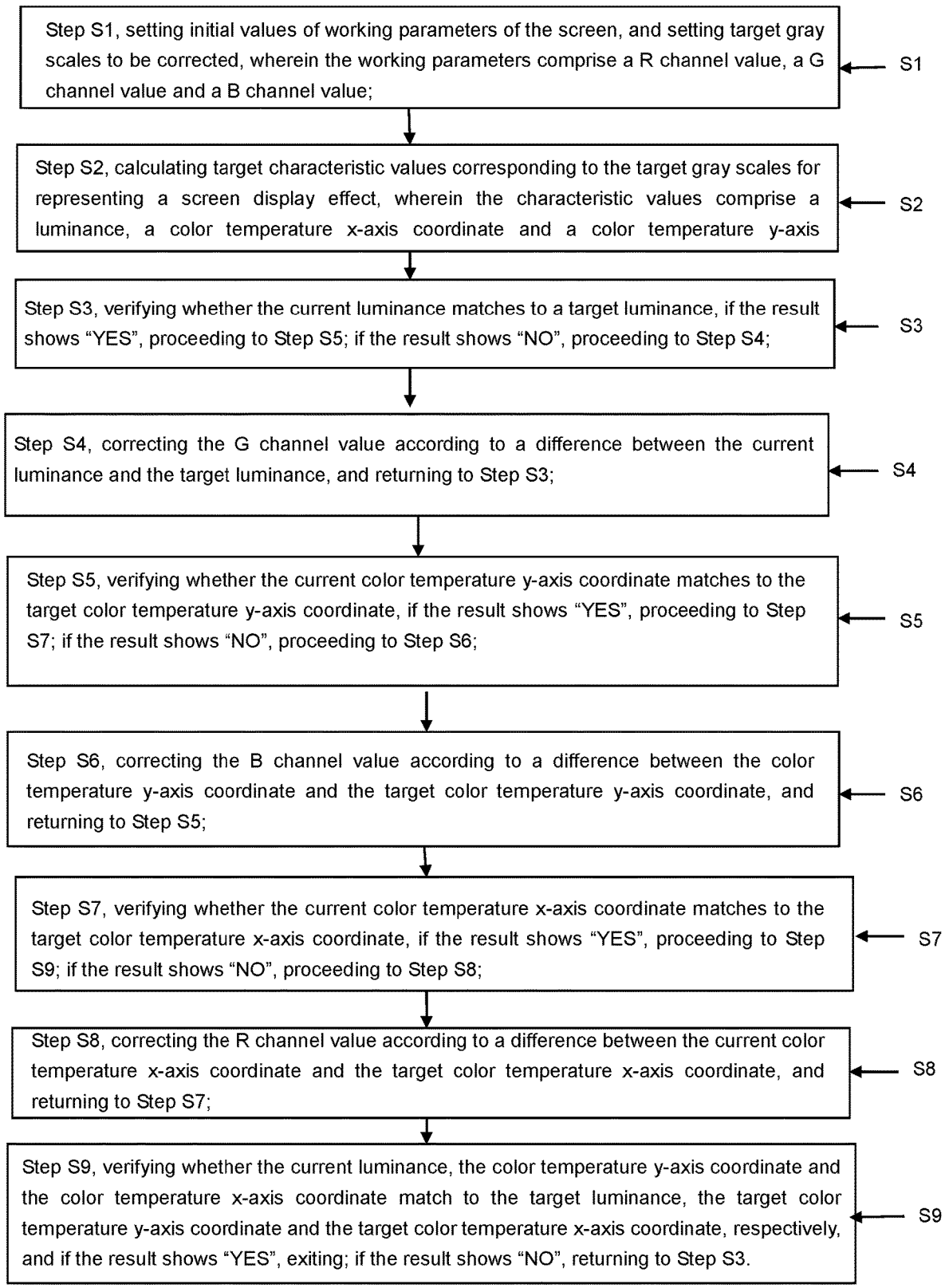

METHOD FOR CORRECTING SCREEN DISPLAY BASED ON NEGATIVE FEEDBACK

CROSS-REFERENCE TO RELATED APPLICATIONS

This application is a national phase of Serial No. PCT/CN2018/108104 filed Sep. 27, 2018, the entire contents of which is incorporated herein by reference, and which claims priority to and the benefit of Chinese Patent Application No. 201711086297.8 filed Nov. 7, 2017.

BACKGROUND OF THE INVENTION

1. Field of the Invention

The invention relates to the technical field of displays, and more particularly, to a method for correcting screen display based on negative feedback.

2. Description of the Related Art

In the process of production of screens, such as Plasma Display Panels (PDPs), and Liquid Crystal Displays (LCDs), luminance of the three primary colors of red, green and blue are not uniformly distributed. As a result, manufacturers cannot ensure that each display delivered from the factory can have the best color performance, and it is the same case for displays of the same brand and of the same batch, which are manufactured in the same process. Therefore, correction of a color temperature and luminance of each gray scale of the screen is required. A common correction method is to correct the color temperature and brightness of the gray scale by correcting the parameters of the three color channels of R, G, and B under the current gray scale, such that the color temperature and brightness of the gray scale meet the requirements.

Since each of the parameters of the three color channels of R, G, and B has a different impact on the luminance, the color temperature of the screen display, respectively, and adjusting of one of the parameters will always lead to changes in the luminance and the color temperature, during the course of correction of the screen display, a method for simultaneous correlation correction of the parameters of the three color channels of R, G, and B is often used. However, for the above-mentioned method, there are problems that the accuracy of a single correction is relative low and the correction speed is relative slow.

SUMMARY OF THE INVENTION

Given that the foregoing problems exist in the prior art, the present invention provides a method for correcting screen display based on negative feedback, wherein the method aims to solve the problems that the accuracy of a single correction is relative low and the correction speed is relative slow in the process of correction of the luminance and the color temperature of a screen. The present invention adopts the following technical solutions:

A method for correcting screen display based on negative feedback, comprising steps of:

Step S1, setting initial values of working parameters of the screen, and setting target gray scales to be corrected, wherein the working parameters comprise a R channel value, a G channel value and a B channel value;

Step S2, calculating target characteristic values corresponding to the target gray scales for representing a screen display effect, wherein the characteristic values comprise a luminance, a color temperature x-axis coordinate and a color temperature y-axis coordinate;

Step S3, verifying whether the current luminance matches to a target luminance, if the result shows "YES", proceeding to Step S5; if the result shows "NO", proceeding to Step S4;

Step S4, correcting the G channel value according to a difference between the current luminance and the target luminance, and returning to Step S3;

Step S5, verifying whether the current color temperature y-axis coordinate matches to the target color temperature y-axis coordinate, if the result shows "YES", proceeding to Step S7; if the result shows "NO", proceeding to Step S6;

Step S6, correcting the B channel value according to a difference between the color temperature y-axis coordinate and the target color temperature y-axis coordinate, and returning to Step S5;

Step S7, verifying whether the current color temperature x-axis coordinate matches to the target color temperature x-axis coordinate, if the result shows "YES", proceeding to Step S9; if the result shows "NO", proceeding to Step S8;

Step S8, correcting the R channel value according to a difference between the current color temperature x-axis coordinate and the target color temperature x-axis coordinate, and returning to Step S7; and Step S9, verifying whether the current luminance, the color temperature y-axis coordinate and the color temperature x-axis coordinate match to the target luminance, the target color temperature y-axis coordinate and the target color temperature x-axis coordinate, respectively, and if the result shows "YES", exiting; if the result shows "NO", returning to Step S3.

Preferably, in the above-mentioned method for correcting screen display, the current luminance, the color temperature y-axis coordinate, and the color temperature x-axis coordinate are obtained by measurement.

Preferably, in the above-mentioned method for correcting screen display, the target luminance is calculated by a following formula:

$$Lv_t = \left(\frac{1}{n}\right)^{gamma\_pow}(Lv_{max} - Lv_{min}) + Lv_{min};$$

where $Lv_t$ represents the target luminance, n represents a sum of luminance levels of the screen, i represents the number of levels of the target gray scale, gamma_pow is a preset value, $Lv_{max}$ represents the maximum luminance value of the screen, and $Lv_{min}$ represents the minimum luminance value of the screen.

Preferably, in the above-mentioned method for correcting screen display, the maximum luminance value and the minimum luminance value are obtained by measurement, and a specific method comprises:

adjusting the screen display to a maximum gray scale prior to correction of the screen display, and measuring a luminance value of the screen display to obtain the maximum luminance value; and adjusting the screen display to a minimum gray scale prior to correction of the screen display, and measuring a luminance value of the screen display to obtain the minimum luminance value.

Preferably, in the above-mentioned method for correcting screen display, the target color temperature y-axis coordinate and the target color temperature x-axis coordinate are settable constants.

Preferably, in the above-mentioned method for correcting screen display, a method for verifying whether the current luminance matches to the target luminance comprises verifying whether a difference between the current luminance and the target luminance is less than or equal to a first threshold value, if so, the current luminance matches to the target luminance; otherwise, the current luminance does not match to the target luminance.

Preferably, in the above-mentioned method for correcting screen display, a method for verifying whether the current color temperature y-axis coordinate matches to the target color temperature y-axis coordinate comprises verifying whether a difference between the current color temperature y-axis coordinate and the target color temperature y-axis coordinate is less than or equal to a second threshold value, if so, the current color temperature y-axis coordinate matches to the target color temperature y-axis coordinate; otherwise, the current color temperature y-axis coordinate does not match to the target color temperature y-axis coordinate.

Preferably, in the above-mentioned method for correcting screen display, a method for verifying whether the current color temperature x-axis coordinate matches to the target color temperature x-axis coordinate comprises verifying whether a difference between the current color temperature x-axis coordinate and the target color temperature x-axis coordinate is less than or equal to a third threshold value, if so, the current color temperature x-axis coordinate matches to the target color temperature x-axis coordinate; otherwise, the current color temperature x-axis coordinate does not match to the target color temperature x-axis coordinate.

The above-mentioned technical solutions have the following advantages: the R channel value, the G channel value and the B channel value are corrected in a separate manner, and the correction process is simplified, such that the accuracy of a single correction is higher and the correction speed is improved.

BRIEF DESCRIPTION OF THE DRAWINGS

The accompanying drawings, together with the specification, illustrate exemplary embodiments of the present disclosure, and, together with the description, serve to explain the principles of the present invention.

FIG. 1 is a flowchart of a method for correcting luminance and color temperature of a screen in a preferred embodiment according to the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

In a preferred embodiment of the present invention, as shown in FIG. 1, a method for correcting screen display based on negative feedback is provided, wherein the method comprises steps of:

Step S1, setting initial values of working parameters of the screen, and setting target gray scales to be corrected, wherein the working parameters comprise a R channel value, a G channel value and a B channel value;

Step S2, calculating target characteristic values corresponding to the target gray scales for representing a screen display effect, wherein the characteristic values comprise a luminance, a color temperature x-axis coordinate and a color temperature y-axis coordinate;

Step S3, verifying whether the current luminance matches to a target luminance, if the result shows "YES", proceeding to Step S5; if the result shows "NO", proceeding to Step S4;

Step S4, correcting the G channel value according to a difference between the current luminance and the target luminance, and returning to Step S3;

Step S5, verifying whether the current color temperature y-axis coordinate matches to the target color temperature y-axis coordinate, if the result shows "YES", proceeding to Step S7; if the result shows "NO", proceeding to Step S6;

Step S6, correcting the B channel value according to a difference between the color temperature y-axis coordinate and the target color temperature y-axis coordinate, and returning to Step S5;

Step S7, verifying whether the current color temperature x-axis coordinate matches to the target color temperature x-axis coordinate, if the result shows "YES", proceeding to Step S9; if the result shows "NO", proceeding to Step S8;

Step S8, correcting the R channel value according to a difference between the current color temperature x-axis coordinate and the target color temperature x-axis coordinate, and returning to Step S7; and Step S9, verifying whether the current luminance, the color temperature y-axis coordinate and the color temperature x-axis coordinate match to the target luminance, the target color temperature y-axis coordinate and the target color temperature x-axis coordinate, respectively, and if the result shows "YES", exiting; if the result shows "NO", returning to Step S3.

Furthermore, in a preferred embodiment of the present invention, the current luminance, the color temperature y-axis coordinate and the color temperature x-axis coordinate are obtained by measurement.

The number of gray scales corresponds to the number of levels of luminance of the screen. For example, the screen having a color depth of 8 bit has 256 levels of luminance, corresponding to 256 gray scales, that is, 0 level, 1 level . . . 255 level gray scale. In this embodiment, a luminance and color temperature meter is arranged in front of the screen to detect the luminance and the color temperature of the screen display (including the color temperature x-axis coordinate and the color temperature y-axis coordinate), which are taken as a feedback for the correction of the target luminance and the target color temperature of the screen display of a specific gray scale. Characteristic values of the screen display are measured after each adjustment of the working parameters. Therefore, when the screen display is corrected, the correction can be started from any level of gray scale, and the correction can be performed without relying on the history record, and the correction process is more flexible.

In the above-mentioned technical solution, the R channel value, the G channel value and the B channel value are corrected in a separate manner, and the correction process is simplified, such that the accuracy of a single correction is higher and the correction speed is faster.

In a preferred embodiment of the present invention, the target luminance is calculated by following formula:

$$Lv_t = \left(\frac{1}{n}\right)^{gamma\_pow}(Lv_{max} - Lv_{min}) + Lv_{min};$$

where $Lv_t$ represents the target luminance, n represents a sum of luminance levels of the screen, i represents the number of levels of the target gray scale, gamma_pow is a preset value, L represents the maximum luminance value of the screen, and $Lv_{min}$ represents the minimum luminance value of the screen.

In a preferred embodiment of the present invention, the maximum luminance value and the minimum luminance value are obtained by measurement, and a specific method comprises:

adjusting the screen display to a maximum gray scale prior to correction of the screen display, and measuring a luminance value of the screen display to obtain the maximum luminance value; and adjusting the screen display to a minimum gray scale prior to correction of the screen display, and measuring a luminance value of the screen display to obtain the minimum luminance value.

In a preferred embodiment of the present invention, the target color temperature y-axis coordinate and the target color temperature x-axis coordinate are settable constants.

In a preferred embodiment of the present invention, a method for verifying whether the current luminance matches to the target luminance comprises verifying whether a difference between the current luminance and the target luminance is less than or equal to a first threshold value, if so, the current luminance matches to the target luminance; otherwise, the current luminance does not match to the target luminance.

In a preferred embodiment of the present invention, a method for verifying whether the current color temperature y-axis coordinate matches to the target color temperature y-axis coordinate comprises verifying whether a difference between the current color temperature y-axis coordinate and the target color temperature y-axis coordinate is less than or equal to a second threshold value, if so, the current color temperature y-axis coordinate matches to the target color temperature y-axis coordinate; otherwise, the current color temperature y-axis coordinate does not match to the target color temperature y-axis coordinate.

In a preferred embodiment of the present invention, a method for verifying whether the current color temperature x-axis coordinate matches to the target color temperature x-axis coordinate comprises verifying whether a difference between the current color temperature x-axis coordinate and the target color temperature x-axis coordinate is less than or equal to a third threshold value, if so, the current color temperature x-axis coordinate matches to the target color temperature x-axis coordinate; otherwise, the current color temperature x-axis coordinate does not match to the target color temperature x-axis coordinate.

In this embodiment, a conversion formula for converting from CIE_RGB to CIE_XYZ is shown as $$\begin{bmatrix} X \\ Y \\ Z \end{bmatrix} = \begin{bmatrix} 0.4887180 & 0.3106803 & 0.2006007 \\ 0.1762044 & 0.8129847 & 0.0108109 \\ 0.0000000 & 0.0102048 & 0.9897952 \end{bmatrix} \begin{bmatrix} R \\ G \\ B \end{bmatrix}; \quad (1)$$

where X, Y and Z represent the spectral tristimulus values in the CIE_XYZ system, X represents the red primary color, Y represents the green primary color, and Z represents the blue primary color. R, G, B are the spectral tristimulus values in the CIE_RGB system.

And the CIE_xyY color formula is shown as $$Lv = Y \quad (2)$$
$$Sx = \frac{X}{X+Y+Z}$$
$$Sy = \frac{Y}{X+Y+Z};$$

where Lv represents the luminance of the screen display, Sx and Sy represent the color temperature x-axis coordinate and the color temperature y-axis coordinate of the screen display, respectively.

It can be seen from Formulas (1) and (2) that when the B channel value increases, Z increases significantly, and Lv increases, sx decreases, and sy decreases; when the G channel value increases, Y increases significantly, and X increases, Lv increases, sx decreases, and sy increases; when the R channel value increases, X increases significantly, and X increases, Lv increases, sx increases, and sy decreases.

Thus, in this embodiment, in the case where the measured values of Sx and Sy are close to the target values, it is assumed that Lv is only a function of the G channel value (change in the G channel value has the greatest impact on Lv), which is expressed as Lv=I(g), where Lv is the measured value of the luminance. Since the function is monotonically increasing, to make the Lv value close to a target value $Lv_t$, a negative feedback relationship is required. Therefore, a luminance and color temperature meter is arranged in front of the screen. After each adjustment of the G channel value, the luminance value (Lv is I(g)) displayed currently in the screen is measured. When I(g)>Lv$_t$, the G channel value is reduced accordingly according to a difference between Lv and I(g), and the G channel value is adjusted to be larger, and vice versa, so that Lv reaches the target value.

In order to ensure that the above-mentioned operation is performed when Sx and Sy are close to the target values, for each adjustment of the G channel value in the above-mentioned operation, that is to say, a G channel value is given, the G channel value is constant, and the B channel value and the R channel value are adjusted. And proper adjustment of the B channel value and the R channel value relies on whether the color temperature y-axis coordinate (Sy) and the color temperature x-axis coordinate (Sx) close to their respective target values.

When the B channel value is increased separately, Sy will increase, and Sx will decrease; when the B channel value is decreased separately, Sy will decrease, and Sx will increase; when the R channel value is increased separately, Sx will increase, and Sy almost keeps the same without any obvious influence; and when the R channel value is decreased separately, Sx will decrease, and Sy almost keeps the same without any obvious influence.

Thus, the B channel value is adjusted firstly, it is assumed that the function relationship between Sy and the B channel value is Sy=y(b). The function is monotonically decreasing. In order to make Sy close to one target value (the target value of the color temperature y-axis coordinate is represented as Sy$_t$), a negative feedback is required. After each adjustment of the B channel value, the color temperature y-axis coordinate (Sy is y(b)) currently displayed in the screen is measured. When y(b)>Sy$_t$, the B channel value is increased accordingly according to a difference between Sy$_t$ and y(b), and vice versa, so that Sy reaches the target value.

Finally, the R channel value is adjusted, it is assumed that the function relationship between Sx and the R channel value is Sx=x(r). The function is monotonically decreasing. In order to make Sx close to one target value (the target value of the color temperature x-axis coordinate is represented as Sx$_t$), a negative feedback is required. After each adjustment of the R channel value, the color temperature x-axis coordinate (Sx is x(r)) currently displayed in the screen is measured. When x(r)>Sx$_t$, the R channel value is reduced accordingly according to a difference between Sx$_t$ and x(r), and vice versa, so that Sx reaches the target value.

Correction of the G channel value, the B channel value and the R channel value in turn is marked as a correction of the working parameters of the screen. Measuring if the luminance, color temperature y-axis coordinate and color temperature x-axis coordinate of the screen display simultaneously reach the corresponding target values after correcting the working parameters for one time; if yes, the current gray scale correction is ended, levels of the gray scale to be corrected can be set again, and a corresponding gray scale correction is carried out; otherwise, correcting the working parameters of the current gray scale again by starting from correction of the G channel value.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for correcting screen display based on negative feedback, comprising steps of:

Step S1, setting initial values of working parameters of the screen, and setting target gray scales to be corrected, wherein the working parameters comprise a R channel value, a G channel value and a B channel value;

Step S2, calculating target characteristic values corresponding to the target gray scales for representing a screen display effect, wherein the characteristic values comprise a luminance, a color temperature x-axis coordinate and a color temperature y-axis coordinate;

Step S3, verifying whether the current luminance matches to a target luminance, if the result shows "YES", proceeding to Step S5; if the result shows "NO", proceeding to Step S4;

Step S4, correcting the G channel value according to a difference between the current luminance and the target luminance, and returning to Step S3;

Step S5, verifying whether the current color temperature y-axis coordinate matches to the target color temperature y-axis coordinate, if the result shows "YES", proceeding to Step S7; if the result shows "NO", proceeding to Step S6;

Step S6, correcting the B channel value according to a difference between the color temperature y-axis coordinate and the target color temperature y-axis coordinate, and returning to Step S5;

Step S7, verifying whether the current color temperature x-axis coordinate matches to the target color temperature x-axis coordinate, if the result shows "YES", proceeding to Step S9; if the result shows "NO", proceeding to Step S8;

Step S8, correcting the R channel value according to a difference between the current color temperature x-axis coordinate and the target color temperature x-axis coordinate, and returning to Step S7; and Step S9, verifying whether the current luminance, the color temperature y-axis coordinate and the color temperature x-axis coordinate match to the target luminance, the target color temperature y-axis coordinate and the target color temperature x-axis coordinate, respectively, and if the result shows "YES", exiting; if the result shows "NO", returning to Step S3.

2. The method for correcting screen display as claimed in claim 1, wherein the current luminance, the color temperature y-axis coordinate and the color temperature x-axis coordinate are obtained by measurement.

3. The method for correcting screen display as claimed in claim 1, wherein the target luminance is calculated by a following formula:

$$Lv_t = \left(\frac{1}{n}\right)^{gamma\_pow}(Lv_{max} - Lv_{min}) + Lv_{min};$$

where $Lv_t$ represents the target luminance, n represents a sum of luminance levels of the screen, i represents the number of levels of the target gray scale, gamma_pow is a preset value, $Lv_{max}$ represents the maximum luminance value of the screen, and $Lv_{min}$ represents the minimum luminance value of the screen.

4. The method for correcting screen display as claimed in claim 3, wherein the maximum luminance value and the minimum luminance value are obtained by measurement, and a specific method comprises:

adjusting the screen display to a maximum gray scale prior to correction of the screen display, and measuring a luminance value of the screen display to obtain the maximum luminance value; and adjusting the screen display to a minimum gray scale prior to correction of the screen display, and measuring a luminance value of the screen display to obtain the minimum luminance value.

5. The method for correcting screen display as claimed in claim 1, wherein the target color temperature y-axis coordinate and the target color temperature x-axis coordinate are settable constants.

6. The method for correcting screen display as claimed in claim 1, wherein a method for verifying whether the current luminance matches to the target luminance comprises verifying whether a difference between the current luminance and the target luminance is less than or equal to a first threshold value, if so, the current luminance matches to the target luminance; otherwise, the current luminance does not match to the target luminance.

7. The method for correcting screen display as claimed in claim 1, wherein a method for verifying whether the current color temperature y-axis coordinate matches to the target color temperature y-axis coordinate comprises verifying whether a difference between the current color temperature y-axis coordinate and the target color temperature y-axis coordinate is less than or equal to a second threshold value, if so, the current color temperature y-axis coordinate matches to the target color temperature y-axis coordinate; otherwise, the current color temperature y-axis coordinate does not match to the target color temperature y-axis coordinate.

8. The method for correcting screen display as claimed in claim 1, wherein a method for verifying whether the current color temperature x-axis coordinate matches to the target color temperature x-axis coordinate comprises verifying whether a difference between the current color temperature x-axis coordinate and the target color temperature x-axis coordinate is less than or equal to a third threshold value, if so, the current color temperature x-axis coordinate matches to the target color temperature x-axis coordinate; otherwise, the current color temperature x-axis coordinate does not match to the target color temperature x-axis coordinate.

* * * * *